Patented Oct. 1, 1940

2,216,574

UNITED STATES PATENT OFFICE

2,216,574

PREPARATION OF HALOGEN DERIVATIVES OF ACETOPROPANOL

Theodore Deering Perrine, Wittenberg, N. Y., assignor, by mesne assignments, to Research Corporation, New York, N. Y., a corporation of New York No Drawing. Application July 12, 1938,
Serial No. 218,767

6 Claims. (Cl. 260—594)

This invention relates to the preparation of halogen derivatives of acetopropanol, and has for its object the provision of a simple, effective and economical method of preparing such derivatives.

Halogen derivatives of acetopropanol are useful in the preparation of thiazole derivatives which may be employed in the synthesis of vitamin $B_1$. The present invention pertains to the preparation of the 3-chlor and 3-brom derivatives of 3-acetopropan-1-ol, both of which are suitable as a basis for the preparation of such thiazole derivatives.

In accordance with the invention, 3-acetopropan-1-ol is directly halogenated by the reaction of a sulfuryl halide therewith in the presence of a suitable solvent. The following description of a specific example of the invention, will serve to illustrate how the invention may be practiced.

About 51 grams of 3-acetopropan-1-ol are dissolved in 500 cc. of dry benzene and the solution is stirred and cooled to about 3° C., at which temperature the benzene begins to crystallize slowly. Then about 101 grams of sulfuryl chloride are added drop by drop while the solution is being thoroughly stirred and maintained at a temperature between —5° and +5° C. After all of the sulfuryl chloride is added, the temperature of the mixture is allowed to rise to about 23° C., when 250 cc. of 1 N hydrochloric acid are added and the mixture is refluxed for about two and a half hours. The mixture is then cooled to about 40° C. and the benzene is removed, washed and dried. The aqueous parts are extracted several times with ether and the extracts are combined and dried over potassium carbonate. The resulting material is then evaporated to dryness and the residue is distilled in vacuo at a pressure of about .1 mm. of mercury.

The product is relatively pure 3-chlor-3-acetopropan-1-ol and boils at a temperature of about 92° C. The yield of this product is about 87% of the amount theoretically possible.

By a similar procedure, the corresponding brom acetopropanol may be prepared by treating 3-acetopropan-1-ol dissolved in a suitable solvent, such as benzene, with sulfuryl bromide.

While it has been proposed heretofore to halogenate acetopropanol by reacting upon the pure, undissolved compound with sulfuryl halides, the yields obtained by that method are relatively poor. On the other hand, by practising the present invention, in which the reaction is carried out with a solution of the acetopropanol in a suitable solvent, the yield is increased to almost 90% of the theoretical yield.

Instead of employing benzene as the solvent for the acetopropanol, other suitable solvents or mixtures of solvents may be used. For example, ligroin, toluene, petroleum fractions having appropriate boiling points, chlorinated solvents such as carbon tetrachloride and chloroform, and ethers such as ethyl ether and isopropyl ether, may be substituted for the benzene with satisfactory results.

What is claimed is:

1. The process which comprises treating with a sulfuryl halide a solution of 3-aceto propan-1-ol in an organic solvent which is substantially unaffected by the sulfuryl halide.

2. The process which comprises treating a solution of 3-acetopropan-1-ol in an organic solvent from the group consisting of benzene, ligroin, toluene, petroleum fractions, carbon tetrachloride, chloroform, ethyl ether and iso propyl ether with a halogenating agent from the group sulfuryl chloride and sulfuryl bromide.

3. The process which comprises treating a solution of 3-acetopropan-1-ol in benzene with a halogenating agent from the group sulfuryl chloride and sulfuryl bromide.

4. The process which comprises treating a solution of 3-acetopropan-1-ol in benzene with sulfuryl chloride.

5. The process which comprises treating a solution of 3-acetopropan-1-ol in benzene with sulfuryl bromide.

6. The process which comprises treating a solution of 3-acetopropan-1-ol in benzene with a sulfuryl halide.

THEODORE D. PERRINE.